United States Patent
Bonduelle et al.

(10) Patent No.: US 8,633,128 B2
(45) Date of Patent: Jan. 21, 2014

(54) LACUNARY KEGGIN TYPE HETEROPOLYANION BASED ON TUNGSTEN FOR HYDROCRACKING

(75) Inventors: Audrey Bonduelle, Francheville (FR); Fabrice Bertoncini, Lyons (FR); Karima Ben Tayeb, Margny-les-Compiegne (FR); Carole Lamonier, Armentieres (FR); Michel Fournier, Lille (FR); Edmond Payen, Jenlain (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 279 days.

(21) Appl. No.: 13/059,254

(22) PCT Filed: Jul. 29, 2009

(86) PCT No.: PCT/FR2009/000941
§ 371 (c)(1),
(2), (4) Date: Jun. 3, 2011

(87) PCT Pub. No.: WO2010/020714
PCT Pub. Date: Feb. 25, 2010

(65) Prior Publication Data
US 2011/0230691 A1    Sep. 22, 2011

(30) Foreign Application Priority Data
Aug. 19, 2008 (FR) .................................... 08 04642

(51) Int. Cl.
| | | |
|---|---|---|
| *B01J 21/02* | (2006.01) | |
| *B01J 27/00* | (2006.01) | |
| *B01J 27/19* | (2006.01) | |
| *B01J 27/185* | (2006.01) | |
| *B01J 27/182* | (2006.01) | |
| *B01J 29/70* | (2006.01) | |
| *C10G 47/00* | (2006.01) | |
| *C10G 47/02* | (2006.01) | |
| *C10G 47/24* | (2006.01) | |
| *C10G 11/00* | (2006.01) | |
| *C10G 11/02* | (2006.01) | |
| *C10G 45/00* | (2006.01) | |

(52) U.S. Cl.
USPC ........... 502/202; 502/204; 502/206; 502/207; 502/208; 502/211; 502/213; 502/214; 208/46; 208/107; 208/108; 208/113; 208/114; 208/143

(58) Field of Classification Search
USPC ......... 502/202, 204, 206–208, 211, 213, 214; 208/46, 107, 108, 113, 114, 143
See application file for complete search history.

(56) References Cited

U.S. PATENT DOCUMENTS

| | | | |
|---|---|---|---|
| 2,547,380 A | | 4/1951 | Fleck |
| 2,608,534 A | * | 8/1952 | Fleck .............................. 502/211 |
| 6,043,184 A | * | 3/2000 | Karmakar et al. ............. 502/208 |
| 2002/0142914 A1 | * | 10/2002 | Devlin et al. .................. 502/300 |
| 2003/0171604 A1 | | 9/2003 | Mizuno et al. |

FOREIGN PATENT DOCUMENTS

| | | | | |
|---|---|---|---|---|
| FR | 2935139 A1 | * | 2/2010 | ............. C01G 41/00 |
| WO | 9747385 A | | 12/1997 | |

OTHER PUBLICATIONS

"Study of the active phase of NiW hydrocracking sulfided catalysts obtained from an innovated heteropolyanion based preparation," Karima Ben Tayeb et al. Catalysis Today 150 (2010), pp. 207-212.*
"Active phase genesis of NiW hydrocracking catalysts based on nickel salt heteropolytungstate: Comparison with reference catalyst," Karima Ben Tayeb et al. Applied Catalysis B: Environmental 126 (2012), pp. 55-63.*
Preparation of new oxidic precursors based on heteropolyanions for efficient hydrocracking catalysts, Karima Ben Tayeb et al. C. R. Chimie 12 (2009), pp. 692-698.*
World IP Organization. "International Search Report." PCT/FR2009/000941, Applicant: IFP, Mailed: Dec. 16, 2009.
Santos, Isabel C.M.S et al. "Association of Keggin-type anions with cationic meso-substituted porphyrins: synthesis, characterization and oxidative catalytic studies." (Journal of Molecular Catalysis), pp. 35-45, Apr. 20, 2005, vol. 231, No. 1-2.

Niu, Jing-Yang, et al. "Two one-dimensional mono-substituted heteropolytungstates based on Keggin anion units." (Journal of Solid State Chemistry), pp. 3411-3417, Oct. 1, 2004, vol. 177, No. 10.

Zhao, Jun-Wei et al. "A Combination of Lacunary Polyoxometalates and High-Nuclear Transition-Metal Clusters under Hydrothermal Conditions. Part II: From Double Cluster, Dimer, and Tetramer to Three-Dimensional Frameworks." (Chemistry a European Journal), pp. 10030-10045, 2007, vol. 13.

\* cited by examiner

*Primary Examiner* — Patricia L Hailey
(74) *Attorney, Agent, or Firm* — Millen, White, Zelano & Branigan, P.C.

(57) ABSTRACT

The invention describes a heteropolycompound constituted by a nickel salt of a lacunary Keggin type heteropolyanion comprising tungsten in its structure, with formula:

$$Ni_{x+y/2}AW_{11-y}O_{39-5/2y}, zH_2O$$

wherein Ni is nickel, A is selected from phosphorus, silicon and boron, W is tungsten, O is oxygen, y=0 or 2, x=3.5 if A is phosphorus, x=4 if A is silicon, x=4.5 if A is boron, and x=m/2+2 for the rest, and z is a number in the range 0 to 36, in which said heteropolycompound has no nickel atom in substitution for a tungsten atom in its structure, said nickel atoms being placed in the counter-ion position in the structure of said compound.

12 Claims, 2 Drawing Sheets

LACUNARY KEGGIN TYPE HETEROPOLYANION BASED ON TUNGSTEN FOR HYDROCRACKING

The present invention describes a heteropolycompound constituted by a nickel salt of a lacunary Keggin type heteropolyanion comprising tungsten in its structure, with formula:

$$Ni_{x+y/2}AW_{11-y}O_{39-5/2y}, zH_2O$$

wherein Ni is nickel;
A is selected from phosphorus, silicon and boron;
W is tungsten;
O is oxygen;
y=0 or 2;
x=3.5 if A is phosphorus;
x=4 if A is silicon;
x=4.5 if A is boron;
and x=m/2+2 for the rest;
and z is a number in the range 0 to 36, and m equals 3 if A is phosphorus, m equals 4 if A is silicon and m equals 5 is A is boron, in which said heteropolycompound has no nickel atom in substitution for a tungsten atom in its structure, said nickel atoms being placed in the counter-ion position in the structure of said compound.

The present invention also describes a process for preparing said heteropolycompound constituted by a nickel salt of a lacunary Keggin type heteropolyanion comprising tungsten in its structure.

The present invention also relates to a catalyst comprising said heteropolycompound and to hydrocracking; hydroconversion and/or hydrotreatment processes employing said catalysts.

In particular, the invention concerns the hydrocracking of hydrocarbon feeds containing for example aromatic and/or olefinic and/or naphthenic and/or paraffinic compounds, for example, including feeds derived from the Fischer-Tropsch process and possibly containing metals and/or nitrogen and/or oxygen and/or sulphur.

The aim of the hydrocracking process is essentially the production of middle distillates, i.e. cuts with an initial boiling point of at least 150° C. and an end point of up to just before the initial boiling point of residue, for example below 340° C. or even 370° C.

The invention also concerns the hydrotreatment of hydrocarbon feeds such as oil cuts, cuts derived from coal or hydrocarbons produced from natural gas. Such hydrocarbon feeds comprise nitrogen and/or sulphur and/or aromatic and/or olefinic and/or naphthenic and/or paraffinic compounds, said feeds possibly containing metals and/or oxygen and/or sulphur. The term "hydrotreatment" means hydrogenation, hydrodesulphurization, hydrodenitrogenation, hydrodeoxygenation, hydrodearomatization and hydrodemetallization reactions.

PRIOR ART

Hydrocracking heavy petroleum feeds is a very important refining process which allows lighter fractions such as gasoline, jet fuel and light gas oil to be produced from surplus heavy feeds which are difficult to upgrade, which lighter fractions are needed by the refiner to enable production to be matched to demand. Some hydrocracking processes can also produce a highly purified residue which can constitute an excellent base for oils. The advantage of catalytic hydrocracking over catalytic cracking is that it can provide very, good quality middle distillates, jet fuels and gas oils. In contrast, the gasoline produced has a much lower octane number than that resulting from catalytic cracking.

Hydrocracking is a process which draws its flexibility from three principal elements which are the operating conditions used, the types of catalysts employed and the fact that hydrocracking of hydrocarbon feeds can be carried out in one or two-steps.

The hydrocracking catalysts used in hydrocracking processes are all bifunctional, combining an acid function and a hydrodehydrogenating function. The acid function is supplied by supports with surface areas which are generally in the range 150 to 800 m²/g and have a superficial acidity, such as harogenated aluminas (in particular fluorinated or chlorinated), combinations of boron and aluminium oxides, amorphous mesoporous aluminosilicates and zeolites. The hydrodehydrogenating function is supplied either by one or more metals from group VIB of the periodic table, or by a combination of at least one metal from group VIB of the periodic table and at least one group VIII metal.

The equilibrium between the two, acid and hydrodehydrogenating, functions is one of the parameters which governs the activity and selectivity of the catalyst. A weak acid function and a strong hydrodehydrogenating function produces low activity catalysts which generally operate at a high temperature (390° C.-400° C. or above), and at a low supply space velocity (HSV, expressed as the volume of feed to be treated per unit volume of catalyst per hour, and is generally 2 or less), but have very good selectivity for middle distillates. In contrast, a strong acid function and a weak hydrodehydrogenating function produces very active catalysts but selectivities for middle distillates are poor.

One conventional hydrocracking catalyst type is based on moderately acidic amorphous supports such as aluminosilicates, for example. These systems are used to produce good quality middle distillates and possibly base oils. These catalysts are, for example, used in two-step processes.

The problem which faces the skilled person is obtaining high catalytic performances in hydrocracking processes, in particular in terms of the activity and selectivity for middle distillates, while ensuring satisfactory industrial application. Thus, although good performances can be obtained by improving the textural characteristic of catalysts and their porous matrix supporting them, the performances of said catalysts are also linked to the nature of the hydrogenating phase. The hydrogenating activity will thus play a very important role in hydrodenitrogenation (MN), hydrodearomatization (HAD), hydrodesulphurization (HDS) reactions and on the stability of the catalyst.

The NiW pairing is recognized as the optimal pairing of metals from groups VIB and VIII for the hydrogenation of aromatics as well as for hydrodenitrogenation, key functions for hydrocracking. Despite the high quantities of NiW deposited in "conventional" methods using the usual precursors (ammonium metatungstate and nickel nitrate) on the support and despite parametric studies concerning the preparation steps, we have not succeeded in 1) controlling the dispersion and 2) the morphology of the sheets and 3) in optimizing their degree of promotion on such supports: these are the key essentials in substantially strengthening the hydrogenating power of the active phase and thus in increasing the yield of middle distillates in the hydrocracking process. One of the scientific challenges over the last few years has consisted of optimizing the hydrogenating phase deposited on various catalyst supports for hydrocracking.

In desiring to overcome these problems, the Applicant has demonstrated, in an unexpected manner, that the preparation of NiW type oxides from a nickel salt of a lacunary Keggin type heteropolyanion comprising tungsten deposited on moderately acidic amorphous supports such as aluminosilicate type supports, has the advantage in terms of hydrogenating power: the catalysts prepared thereby have improved catalytic performances in hydrocracking processes. The Applicant has thus discovered, in a surprising manner, that the use of a heteropolycompound with formula $Ni_{x+y/2}AW_{11-y}O_{39-5/2y}, zH_2O$ as defined above and more particularly the use of heteropolycompounds with formula $Ni_4SiW_{11}O_{39}$ and formula $Ni_5SiW_9O_{34}$ produces unexpected catalytic performances in hydrocracking/hydroconversion and hydrotreatment. More precisely, the present invention concerns a process for the preparation of said Ni salts of lacunary Keggin type heteropolyanions comprising W and their use during the preparation of catalysts. These heteropolyanions are determined by various physico-chemical techniques.

The richness of tungsten's chemistry means that heteropolytungstic species with greater or lesser degrees of substitution and compounds of the elements to be deposited can be prepared. It thus involves chemical units the degree of condensation of the tungsten octahedra of which is controlled and in which the nickel is intimately bonded to the structure. These novel materials used in the preparation of solutions for the impregnation of the silica-alumina support constitute the keys to the 3 locks mentioned above. The use of nickel salts of these heteropolyanions means that the presence of ammonium ions, recognized for being at the origin of the limit to good dispersion of the species with a high metals content, can be avoided. The use of said salts deposited on the support as well as the post-treatments carried out during the preparation steps mean that a better control of the dispersion of metals in the oxide state and in the sulphide state and thus in the morphology of the disulphide sheets can be obtained. Further, the use of heteropolytungstates can encourage the metal-promoter interaction by placing them in the same molecular entity, which means that the degree of promotion of the sulphided catalyst can be controlled and thus the number of active sites can be increased.

Polycondensed units comprising nickel and tungsten are known: we can cite $[PNiW_{11}(H_2O)O_{39}]^{n-}$ (Santos ICMS et al, "Association of Keggin-type anions with cationic meso-substituted porphyrins: synthesis, characterization and oxidative catalytic studies", Journal of Molecular Catalysis, vol 231, 2005, pp 35-45) for its applications in homogenous phase oxidation catalysis, or $[SiNiW_{11}O_{39}]^{m-}$ (Niu J Y, Wang Z L, Wang J P, "Two one-dimensional monosubstituted heteropolytungstates based on Keggin anion units", Journal of Solid State Chemistry, vol 177, No 10 (2004), 3411).

The importance of heteropolyanions has already been mentioned in the prior art. As an example, United States document U.S. Pat. No. 2,547,380 mentions the beneficial use of heteropolyacid salts of metals from group VIII, such as the cobalt or nickel salts of phosphomolybdic acid or silicomolybdic acid. In that patent, the heteropolyacid always contains phosphorus or silicon, the latter element being the central atom of the structure. Said compounds have the disadvantage of resulting in limited (group VIII element/group VI element) atomic ratios. As an example, the formula for cobalt phosphomolybdate has a Co/Mo ratio of 0.125.

French patent application FR-2 749 778 describes the importance of heteropolyanions with general formula $M_xAB_{12}O_{40}$ in which M is cobalt or nickel, A is phosphorus, silicon or boron and B is molybdenum or tungsten, x taking the value 2 or more if A is phosphorus, 2.5 or more if A is silicon and 3 or more if A is boron. Said structures have the advantage over the structures disclosed in U.S. Pat. No. 2,547,380 of achieving (group VIII element/group VI element) atomic ratios that are higher and thus produce better performing catalysts. This increase in the ratio is obtained by means of the presence of at least a portion of the molybdenum or tungsten with a valency that is lower than its normal value of six as is obtained, for example, in the composition of phosphomolybdic acid, phosphotungstic acid, silicomolybdic acid or silicotungstic acid.

Patent application FR-2 764 211 describes the synthesis and use of heteropolyanions with formula $M_xAB_{11}O_{40}M'C_{(Z-2x)}$ in which M is cobalt or nickel, A is phosphorus, silicon or boron and B is molybdenum or tungsten, M' is cobalt, iron, nickel, copper or zinc, and C is an $H^+$ ion or an alkylammonium cation, x takes the value 0 to 4.5 and z takes a value between 7 and 9. Thus, this formula corresponds to that claimed in FR-2 749 778, but in which one atom M' is substituted with one atom B. This latter formula has the advantage of producing atomic ratios between the group VIII element and the group VI element that can reach 0.5. However, even though the (group VIII element/group VI element) ratio is high in that case, the preparation method described in patent FR-2.764 211 necessitates 2 or even 3 exchanges and thus 2 or even 3 filtrations with yields not exceeding 80% for each filtration step. Finally, the fact that a portion of the M atoms are substituted and not as a counter-ion limits dissolution of the compounds of the invention in FR-2 764 211 compared with a heteropolycompound of the invention, which would contain the same number of B and M+M' atoms but in which all of the atoms M would be counter-ions and surrounded by 6 molecules of water in an octahedral environment. The compounds described in FR-2 764 211 are thus less soluble than the heteropolycompounds of the invention at the same B atom and M atom contents. If the compounds are less soluble for the same support, it is not possible to deposit as much of the precursors in a single impregnation step with the compounds of patent FR-2 764 211 as with the compounds of the present invention. The hydrogenating activity is directly linked to the quantity of active phase deposited.

One advantage of the present invention resides in the synthesis of said novel heteropolycompounds and in the originality of their mode of production, which means that these compounds can be obtained with a high Ni/W ratio in a yield of more than 80%.

DESCRIPTION OF THE INVENTION

The present invention describes a heteropolycompound constituted by a nickel salt of a lacunary Keggin type heteropolyanion comprising tungsten in its structure, with formula:

$$Ni_{x+y/2}AW_{11-y}O_{39-5/2y}, zH_2O \qquad (I)$$

wherein Ni is nickel;
A is selected from phosphorus, silicon and boron;
W is tungsten;
O is oxygen;
y=0 or 2;
x=3.5 if A is phosphorus;
x=4 if A is silicon;
x=4.5 if A is boron;
and x=m/2+2 for the rest;
and z is a number in the range 0 to 36, and m equals 3 if A is phosphorus, m equals 4 if A is silicon and m equals 5 is A is boron, in which said heteropolycompound has no nickel atom in substitution for a tungsten atom in its structure, said nickel atoms being placed in the counter-ion position in the structure of said compound.

In accordance with the invention, said heteropolycompounds do not have nickel atoms in substitution for a tungsten atom. The nickel atoms are systematically placed in the position of counter-ion in the structure; advantageously, this is due to the mode of preparation.

In accordance with a preferred embodiment, the heteropolycompound constituted by a nickel salt of a lacunary Keggin type heteropolyanion comprising tungsten in its structure has the following formula:

$$Ni_xAW_{11}O_{39}, zH_2O$$

wherein Ni is nickel;
A is a group selected from phosphorus, silicon and boron;
W is tungsten;
O is oxygen;
x is a number equal to 3.5 if the group A is phosphorus, equal to 4 if the group A is silicon or equal to 4.5 if the group A is boron;
and z is a number in the range 0 to 36, in which said heteropolycompound has no nickel atom in substitution for a tungsten atom in its structure, said nickel atoms being placed in the counter-ion position in the structure of said compound.

Highly preferably, said heteropolycompound is the compound with formula $Ni_4SiW_{11}O_{39}$.

In accordance with another preferred embodiment, the heteropolycompound constituted by a nickel salt of a lacunary Keggin type heteropolyanion comprising tungsten in its structure has the following formula:

$$Ni_{x+1}AW_9O_{34}, zH_2O$$

wherein Ni is nickel;
A is a group selected from phosphorus; silicon and boron;
W is tungsten;
O is oxygen;
x is a number equal to 3.5 if the group A is phosphorus, equal to 4 if the group A is silicon or equal to 4.5 if the group A is boron; and z is a number in the range 0 to 36, in which said heteropolycompound has no nickel atom in substitution for a tungsten atom in its structure, said nickel atoms being placed in the counter-ion position in the structure of said compound.

Highly preferably, said heteropolycompound is the compound with formula $Ni_5SiW_9O_{34}$.

Said heteropolycompounds of the invention are advantageously soluble in aqueous media. They are advantageously isolated and analyzed.

The heteropolyanions with formula (I) may advantageously be analyzed in the solid form or in solution. Analyses by $^{31}P$ NMR (P nuclear magnetic resonance), by $^{29}Si$ NMR (Si nuclear magnetic resonance) and by $^{11}B$ NMR (B nuclear magnetic resonance) of the heteropolycompounds with formula (I) does not reveal any transition between 300 and 600 ppm. A transition at such a chemical displacement would be a sign that nickel, which is paramagnetic, had entered the structure in substitution for a tungsten atom, which is not the case with the heteropolycompounds of the invention.

The use of aqueous solutions of said heteropolycompounds to impregnate the acidic porous supports, preferably an acidic porous mineral matrix, and more preferably matrixes of the aluminosilicate or zeolitic type diluted in alumina, has advantageously resulted in hydrocracking catalysts with an increased hydrogenating activity.

Thus, the present invention also pertains to a catalyst comprising sad heteropolycompound and optionally at least one acidic porous mineral matrix.

One of the essential characteristics of the catalysts of the present invention is the presence, at least in part, of said nickel and tungsten elements in the form of a heteropolycompound in accordance with the invention.

In one preferred embodiment, the catalyst is in the bulk form. In this case, advantageously, in the dry state it has, as a % by weight with respect to the total catalyst mass, 0.01% to 100%, preferably 0.05% to 100% and more preferably 0.1% to 100% by weight of at least said heteropolycompound of the invention including at least nickel and at least tungsten and having the structure (I) described above.

In accordance with a second preferred embodiment, said catalyst is a supported catalyst, the support being formed by at least one acidic porous mineral matrix, preferably amorphous or of low crystallinity, selected from silica-aluminas, aluminosilicates, crystalline or otherwise, mesostructured or otherwise, doped (B, F, P) aluminas selected from the group formed by the category of non zeolitic crystalline molecular sieves such as mesoporous silicas, silicalite, silicoalumino-phosphates, aluminophosphates, ferrosilicates, titanium silicoaluminates, borosilicates, chromosilicates and transition metal aluminophosphates (including cobalt).

In addition to at least one of the compounds cited above, the acidic porous mineral matrix may also advantageously comprise at least one simple synthetic or natural clay of the 2:1 dioctahedral phyllosilicate or 3:1 trioctahedral phyllosilicate type such as kaolinite, antigorite, chrysotile, montrnorillonite, beidellite, vermiculite, talc, hectorite, saponite or laponite. These clays may possibly be delaminated. It is also advantageously possible to use mixtures of silica-alumina and clay.

In addition to at least one of the compounds cited above, the matrix may also advantageously comprise at least one compound selected from the group formed by the category of molecular sieves of the crystalline aluminosilicate type, synthetic and natural zeolites such as Y zeolite, fluorinated Y zeolite, Y zeolite containing rare earths, 10x zeolite, L zeolite, small pore mordenite, large pore mordenite, omega, NU-10, ZSM-5, ZSM-48, ZSM-22, ZSM-23, ZBM-30, EU-1, EU-2, EU-11, beta zeolite type, or A, NU-87, NU-88, NU-86, NU-85, IM-5, IM-12, IZM-2 and ferrierite zeolite type.

Zeolites which are preferably and usually employed include zeolites wherein the silicon/aluminium (Si/Al) framework ratio is more than approximately 3:1.

Advantageously, zeolites with a faujasite structure are used, in particular stabilized and ultrastabilized Y zeolites (USY), either in the at least partially exchanged form with metal cations, for example cations of alkaline-earth metals and/or cations of rare earth metals with atomic numbers 57 to 71 inclusive, or in the hydrogen form ("Zeolite Molecular Sieves: Structure, Chemistry and Uses", D W BRECK, J Wiley and Sons, 1973).

Preferably, the supported catalyst comprises 0.01% to 25% by weight with respect to the total catalyst mass of NiO, preferably 0.1% to 10% by weight of NiO and 4.99% to 50% by weight with respect to the total catalyst mass of $WO_3$, preferably 9.99% to 40% by weight of $WO_3$ and 25% to 95% by weight of at least one acidic porous mineral matrix, preferably 50% to 90% by weight of said matrix.

Said catalysts are advantageously analyzed by IR, NMR and Raman spectroscopy and by X ray fluorescence elemental analysis.

Techniques and Characterization

The essential characteristics of the structures of the heteropolycompound with formula (I), namely the counter-ion position of the nickel atoms in said heteropolycompound and the degree of condensation, i.e. the quantity of W octahedral in said heteropolycompound or tungsten octahedra in the structure, may be determined by $^{31}P$, $^{29}Si$, $^{11}B$ and by Raman and X ray fluorescence spectroscopy (FX).

Nuclear magnetic resonance (NMR) is a spectroscopic technique for the structural analysis of molecules containing nuclei with a non-zero spin. The resonance frequency of the target nucleus will be directly affected by its chemical environment, and for this reason, starting from a spectrum, it is possible to construct the structure or at least obtain partial information regarding the structure. The most widely used nuclei are $^1H$, $^{13}C$, $^{14}N$, but NMR analysis can also be applied to the nuclei $^{31}P$, $^{29}Si$, $^{11}B$ or even $^{183}W$.

Raman spectroscopy is a non-destructive analytical technique which allows molecular structures to be determined, and amorphous or crystalline systems to be studied, and is particularly sensitive to small structures and thus perfectly suited to the characterization of heteropolyanions.

The distribution and localization of the elements constituting the hydrogenating phase may be determined using techniques such as the Castaing microprobe (distribution profile of the various elements), transmission electron microscopy coupled to X ray analysis of the components of the catalysts (EDX), or by establishing a distribution map of the elements present in the catalyst by electron microprobe. These techniques can show up the presence of these exogenous elements added after synthesis of an amorphous material with a hierarchical and organized porosity comprising silicon constituting the catalyst of the invention. The distribution and localization of the tungsten, nickel and the group constituted by the elements P, B and Si may be determined using these techniques.

The overall composition of the catalyst of the invention may be determined by X ray fluorescence (XF) on the catalyst in the powdered state or by atomic absorption (AA) after acid attack of the catalyst.

In another aspect, the invention concerns a process for the preparation of said heteropolycompound constituted by a nickel salt of lacunary Keggin type heteropolyanions comprising tungsten in its structure, comprising the following steps:

1) synthesizing the Keggin heteropolyanion containing tungsten with formula:

$$Ba_{x+y/2}AW_{11-y}O_{39-5/2y}, zH_2O \quad (I')$$

in which Ba is barium, A is selected from phosphorus, silicon and boron, W is tungsten, O is oxygen, y=0 or 2, x is a number equal to 3.5 if A is phosphorus, equal to 4 if A is silicon or equal to 4.5 if A is boron and x=m/2+2 for the rest and z is a number in the range 0 to 36, by reacting heteropolytungstic acids $H_mAW_{12}O_{40}$ in which A is selected from phosphorus, silicon and boron, H is hydrogen, W is tungsten, O is oxygen and m is equal to 3 if A is phosphorus, m is equal to 4 if A is silicon and m is equal to 5 if A is boron, to which are added x+y/2 equivalents of barium hydroxide $(Ba(OH)_2)$ to form compounds with formula $Ba_{x+y/2}AW_{11-y}O_{39-5/2y}, zH_2O$ (I') in accordance with the following equation:

2) forming the nickel salt of the Keggin heteropolyanion containing tungsten with formula $Ni_{x+y/2}AW_{11-y}O_{39-5/2y}, zH_2O$ (I) from the Keggin heteropolyanion containing tungsten derived from step 1) by substituting $Ba^{2+}$ cations with $Ni^{2+}$ cations by ion exchange on cation exchange resins, said cation exchange resins having previously been exchanged with $Ni^{2+}$ cations.

In accordance with a preferred implementation of the preparation process, the Keggin heteropolyanion containing tungsten prepared in step 1) is the heteropolyanion with formula: $Ba_xAW_{11}O_{39}, zH_2O$ and the nickel salt of the Keggin heteropolyanion containing tungsten is the compound with formula: $Ni_xAW_{11}O_{39}, zH_2O$.

In accordance with a preferred implementation of the preparation process, the Keggin heteropolyanion containing tungsten prepared in step 1) is the heteropolyanion with formula: $Ba_{x+1}AW_9O_{34}, zH_2O$ and the nickel salt of the heteropolyanion containing tungsten is the compound with formula: $Ni_{x+1}AW_9O_{34}, zH_2O$.

In step 1) of the process for the preparation of said heteropolycompound of the invention, the heteropolytungstic acids $H_mAW_{12}O_{40}$ defined above advantageously dissolve instantaneously in contact with water.

The introduction of barium hydroxide, a basic compound, advantageously renders the solution less acid and the tungsten octahedra of the initial heteropolytungstic acids decondense to form $AW_{11}O_{39}^{2x-}$ or $AW_9O_{34}^{2(x+1)-}$ compounds in which A is respectively phosphorus when the initial heteropolytungstic acid is $H_3PW_{12}O_{40}$, in which A is silicon when the initial heteropolytungstic acid is $H_4SiW_{12}O_{40}$ and in which A is boron when the initial heteropolytungstic acid is $H_5BW_{12}O_{40}$. The heteropolyanion structures then advantageously surround the $Ba^{2+}$ ions to compensate the negative charge. The compounds with formula (I') advantageously precipitate out instantaneously or not depending on the concentration of the solution. The solution is then advantageously filtered and the compounds with formula (I') are advantageously isolated.

Step 2) of the process for the preparation of said heteropolycompound of the invention concerns substituting all of the $Ba^{2+}$ cations with $Ni^{2+}$ cations in order to obtain the compound with formula (I) from the compound (I'). The compounds with formula (I') are advantageously taken up into solution at the desired concentration.

The ion exchange in the $2^{nd}$ step is a process by means of which the $Ba^{2+}$ ions in the counter-ion position in the compounds with formula (I') and (II') in solution are advantageously eliminated from said solution by adsorption onto the ion exchange resin in order to be replaced by an equivalent quantity of other ions with the same charge emitted by said resin, in this case $Ni^{2+}$ cations. The ions with opposite charges, in this case anions with formula $AW_{11}O_{39}^{2x-}$ or $AW_9O_{34}^{2(x+1)-}$ (where A is phosphorus, silicon or boron), are not affected and said lacunary Keggin type anionic structures remain integrally conserved.

In order to accelerate exchanges, the ion exchange resin is advantageously finely divided, in order to present the maximum contact surface with the solution; the ion exchange resins are thus used in the form of very fine grains.

Preferably, the cation exchange resins used are acidic cation exchange resins the functional groups of which are advantageously anions of the sulphonate $—SO_3^-$, carboxylate $—CO_2^-$, aminodiacetate $—N(CH_2CO_2^-)_2$, phosphonate $—PO_3^{2-}$ or phosphinate $>PO_2^-$ type, etc.

Preferably, the highly acidic sulphonic cation exchange resins are used. The resins are thus advantageously in this case in the form of a polystyrene sulphonate cross-linked by divinylbenzene. These resins are advantageously selected for their difference in affinities between the various cations which are in this order: 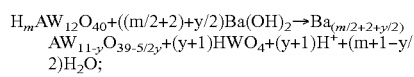. In general, it has been observed that when wishing to increase the difference in affinity between several ions, for the same-type of resin, it is necessary to increase the cross-linking of the resin.

In accordance with step 2) of said preparation process, said cation exchange resins are pre-exchanged with $Ni^{2+}$ cations.

In fact, it is necessary to exchange the commercial resin which is generally supplied in the protonated form ($H^+$) or in the $Na^+$ form with $Ni^{2+}$ ions introduced using a concentrated saline solution. In general, the affinity for a cation increases naturally with its charge and the resin thus has the following order of affinity: $H^+<Ni^{2+}$ and $Na^+<Ni^{2+}$. The exchange cited above is thus easy. Step 2 (exchange of $Ba^{2+}$ ions of compounds with formula (I') and (II')) is only actually carried out when the resin has been completely exchanged with $Ni^{2+}$ ions.

The first exchange reaction, which will prepare the resin for the reaction of step 2, is advantageously written as:

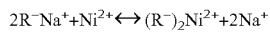

in which $R^-$ represents a sulphonate site, $SO_3^-$, for example.

The exchange reaction which is carried out during the second step is thus advantageously written as

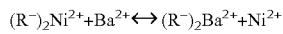

in which $R^-$ represents a sulphonate site, $SO_3^-$, for example.

The solution leaving the ion exchange resin may then advantageously be used to directly impregnate at least one support formed by at least one acidic porous mineral matrix or may optionally undergo evaporation to concentrate the solution.

The supported catalysts of the invention may then be prepared using any method which is known to the skilled person as long as the essential characteristics regarding the position of the nickel and the degree of condensation of the tungsten octahedra in the catalyst in the dry state are obtained.

In accordance with the invention, the supported catalysts of the present invention are prepared in two-steps. The first step consists of preparing the salt corresponding to the intended heteropolyanion with formula (I) using the process for the preparation of said heteropolycompound constituted by a nickel salt with lacunary Keggin type heteropolyanions comprising tungsten in its structure defined hereinabove and the second step consists of impregnation onto the support.

Thus, introduction of the heteropolyanion onto the support to obtain a supported catalyst may advantageously be carried out in a conventional manner using any technique which is known to the skilled person before, during or after forming the support. Preferably, the heteropolyanion is introduced onto the support using the well-known technique of dry impregnation in which a) the support, for example a commercial aluminosilicate, is advantageously impregnated with an aqueous solution containing the desired quantity of, heteropolyanions and optionally molybdenum and/or tungsten introduced in another form and optionally another element from group VIII introduced in another form, b) the moist solid is advantageously left to rest in a moist atmospheric at a temperature in the range 10° C. to 80° C., c) the solid obtained in step b) is advantageously dried under reduced pressure or otherwise at a temperature in the range 50° C. to 300° C.; and d) the solid obtained in step c) is calcined at a temperature in the range 300° C. to 1000° C., more precisely in the range 300° C. to 550° C., for a period of 1 to 24 hours and preferably for a period of 2 to 6 hours, in an oxidizing atmosphere (for example air or oxygen), neutral atmosphere (for example nitrogen or argon) or reducing atmosphere (for example hydrogen).

In order to increase the nickel and tungsten content in the final catalyst, it is possible to carry out multiple impregnations. In this case, prior to impregnating the catalyst for the first time, the catalyst is then advantageously dried under the same conditions as described above and optionally calcined under the same conditions as described above. It is then advantageously impregnated a second time with an aqueous solution containing heteropolyanions with formula (I). The multiple impregnations may then be repeated as many times as is necessary.

The catalysts of the invention may advantageously be manufactured and used in the form of a powder, a crushed screened compacted powder, pellets, granules, tablets, rings, beads, wheels, spheres or extrudates, preferably in the form of a screened crushed compacted powder, spheres or extrudates. It is, however, advantageous for the catalyst to be in the form of extrudates with a diameter in the range 0.5 to 5 mm and more particularly in the range 0.7 to 2.5 mm. The shapes are cylindrical (they may or may not be hollow), twisted cylinders, multilobes (2, 3, 4 or 5 lobes, for example), or rings. The cylindrical shape is preferably used, but any other shape may be employed.

The present invention also pertains to the use of said catalyst comprising said heteropolycompound in a hydrocracking, hydroconversion and/or hydrotreatment process.

The catalysts used in the field of hydrocracking are bifunctional catalysts combining an acid function (provided by the support) and a hydrodehydrogenating function (provided by the metal sulphides). The acid function participates in the isomerization and cracking reactions, while the hydrodehydrogenating function will participate in the hydrotreatment reactions proper, i.e. HDN, HDS and HAD (hydrodearomatization).

All hydrocracking reactions commence with a step employing a hydrogenation reaction or a dehydrogenation reaction involving a metallic hydrodehydrogenating site.

The first step in cracking a paraffin thus commences by generating aha olefin from a paraffin via a dehydrogenation reaction.

The first step in cracking an aromatic ring commences by hydrogenation of the aromatic ring, since a benzene ring is more difficult to crack than the same ring when hydrogenated.

The hydrocracking of vacuum distillates (VD) is a key process leading selectively to middle distillates (gas oil and kerosene) of excellent quality. The choice of the balance between the strength and number of acidic sites and the quality of the hydrogenating function is what determines the selectivity of the catalyst. Thus, a weak cracking function with a strong hydrogenating function will prevent successive cracking and will allow greater selectivity towards middle distillates. Comparatively, a strong cracking function with a weak hydrogenating function will favour successive cracking and the generation of light cuts or even gas.

Finally, the quality of middle distillate cuts depends greatly on the hydrodehydrogenating function and its ability to hydrogenate aromatic rings and to increase the H/C ratio. The smoke point of kerosenes (SP>25 mm) is in particular set by the limiting quantity of aromatics not exceeding 20%. The cetane index of the gas oil (CI≤51) is also set by a low aromatics content, without which the specifications will not be complied with.

For all these reasons, during the design of a hydrocracking catalyst, the skilled person will seek to generate as strong a hydrodehydrogenating function as possible.

Processes for the Treatment of Hydrocarbon Feeds in Accordance with the Invention The catalysts of the invention are advantageously used for the treatment of hydrocarbon cuts, generally in the presence of hydrogen, at a temperature of more than 200° C., at a pressure of more than 1 MPa, the hourly space velocity being in the range 0.1 to 20 $h^{-1}$ and the quantity of hydrogen introduced being such that the litres of hydrogen/litres of hydrocarbon volume ratio is in the range 80 to 5000 L/L.

The catalysts of the invention are advantageously used for hydrocracking and/or hydroconversion of hydrocarbon cuts.

The catalysts of the invention may be used for the hydrotreatment of hydrocarbon feeds, used alone or upstream of a hydrocracking/hydroconversion process.

Sulphurization of Catalysts.

Prior to injecting the feed, the catalysts of the invention, either in, the dry state or in the calcined state, preferably undergo a sulphurization treatment to obtain sulphide type catalysts, the sulphurization treatment allowing at least partial transformation of the metallic species into sulphides before bringing them into contact with the feed to be treated. This sulphurization activation treatment is well known to the skilled person and may be carried out, using any method described in the literature, either in situ, i.e. in the reactor, or ex situ. The sulphur source may advantageously be elemental sulphur, sulphide of carbon, hydrogen sulphide, sulphur-containing hydrocarbons such as dimethylsulphide, dimethyldisulphide, mercaptans, thiophene compounds, thiols, polysulphides such as di-tertiononylpolysulphide or TPS-37 from ATOFINA, oil cuts which are rich in sulphur such as gasoline, kerosene, or gas oil, used alone or as a mixture with a sulphur-containing compound cited above. The preferred source of sulphur is hydrogen sulphide or sulphur-containing hydrocarbons such as dimethyldisulphide. One conventional well known method consists of heating the catalyst, in the presence of hydrogen sulphide (pure or, for example, in a stream of a hydrogen/hydrogen sulphide mixture) to a temperature in the range 150° C. to 800° C., preferably in the range 250° C. to 600° C., generally in a traversed bed reaction zone.

Feeds

A wide variety of feeds may advantageously be treated using the processes of the invention described above; generally, they contain at least 20% by volume and often at least 80% by volume of compounds boiling above 340° C.

The feed may advantageously be LCO (light cycle oil (light gas oils derived from a catalytic cracking unit)), atmospheric distillates, vacuum distillates, for example gas oils derived from straight run distillation or from conversion units such as FCC, coking or visbreaking, as well as feeds deriving from units for the extraction of aromatics from lubricating base oils or derived from solvent dewaxing lubricating base oils, or from distillates deriving from fixed bed or ebullated bed processes for desulphurization or hydroconversion of ARs (atmospheric residues) and/or VRs (vacuum residues) and/or deasphalted oils, or the feed may be a deasphalted oil, the feed may advantageously be constituted by paraffins derived from the Fischer-Tropsch process, or be constituted by vegetable oils, or any mixture of the feeds cited above. The list hereinabove is not limiting. In general, the feeds have a boiling point T5 of more than 340° C., preferably more than 370° C., i.e. 95% of the compounds present in the feed have a boiling point of more than 340° C., more preferably more than 370° C.

The nitrogen content of the feeds treated in the processes of the invention is usually more than 500 ppm, preferably in the range 500 to 10000 ppm by weight, more preferably in the range 700 to 4000 ppm by weight and still more preferably in the range 1000 to 4000 ppm. The sulphur content of the feeds treated in the processes of the invention is usually in the range 0.01% to 5% by weight, preferably in the range 0.2% to 4% and more preferably in the range 0.5% to 3%.

Advantageously, the feed may optionally contain metals. The cumulative nickel and vanadium content of the feeds treated in the processes of the invention is preferably less than 1 ppm by weight.

The asphaltenes content is generally less than 3000 ppm, preferably less than 1000 ppm, and more preferably less than 200 ppm.

Guard Beds

In the case in which the feed contains resin and/or asphaltenes type compounds, it is advantageous to pass the feed initially over a bed of catalyst or adsorbent which is different from the hydrocracking or hydrotreatment catalyst.

The catalysts or guard beds used in the invention have the shape of spheres or extrudates. It is, however, advantageous for the catalyst to be in the form of extrudates with a diameter in the range 0.5 to 5 mm and more particularly in the range 0.7 to 2.5 mm. The shapes are cylindrical (they may or may not be hollow), twisted cylinders, multilobes (2, 3, 4 or 5 lobes, for example), or rings. The cylindrical shape is preferably used, but any other shape may be employed.

In order to compensate for the presence of contaminants and/or poisons in the feed, in another preferred implementation, the guard Catalysts may have more particular geometrical shapes in order to increase their void fraction. The void fraction of these catalysts is in the range 0.2 to 0.75. Their external diameter may be in the range 1 to 35 mm. possible particular non-limiting shapes which may be mentioned are: hollow cylinders, hollow rings, Raschig rings, hollow toothed rings, hollow crenellated rings, pentaring cartwheels, multiple hole cylinders, etc.

These catalysts may or may not have been impregnated with an active phase. Preferably, the catalysts are impregnated with a hydrodehydrogenating phase. More preferably, the CoMo or NiMo phase is used.

These catalysts may have macropores. The guard beds may be those sold by Norton-Saint-Gobain, for example MacroTrap® guard beds. The guard beds may be those sold by Axens from the ACT category: ACT077, ACT935, ACT961 or HMC841, HMC845, HMC941 or HMC945.

It may be particularly advantageous to superimpose these catalysts in at least two beds with different heights. The catalysts with the highest void fraction are preferably used in the first catalytic bed or beds at the inlet to the catalytic reactor. It may also be advantageous to use at least two different reactors for these catalysts.

The preferred guard beds for use in the invention are HMCs and ACT961.

Operating Conditions

The operating conditions such as temperature, pressure, hydrogen recycle ratio, or hourly space velocity may vary widely as a function of the nature of the feed, the quality of the desired products and the facilities available to the refiner. The hydrocracking/hydroconversion or hydrotreatment catalyst is advantageously generally brought into contact, in the presence of hydrogen, with the feeds described above, at a temperature of, more than 200° C., often in the range 250° C. to 480° C., advantageously in the range 320° C. to 450° C., preferably in the range 330° C. to 435° C., at a pressure of more than 1 MPa, often in the range 2 to 25 MPa, preferably in the range 3 to 20 MPa, the hourly space velocity being in the range 0.1 to 20 $h^{-1}$, preferably 0.1-6 $h^{-1}$, preferably 0.2-3 $h^{-1}$, and the quantity of hydrogen introduced is such that the litres of hydrogen/litres of hydrocarbon volume ratio is in the range 80 to 5000 L/L and usually in the range 100 to 2000 L/L.

These operating conditions used in the processes of the invention can generally reach conversions per pass into products with boiling points of less than 340° C., preferably less than 370° C., of more than 15% and more preferably in the range 20% to 95%.

Implementations

The hydrocracking and/or hydroconversion processes employing the catalysts of the invention cover the pressure and conversion fields from mild hydrocracking to high pressure hydrocracking. The term "mild hydrocracking" means hydrocracking leading to moderate conversions, generally less than 40%, and operating at low pressure, generally in the range 2 MPa to 6 MPa.

The catalyst of the present invention can advantageously be used alone, in a single or several fixed catalytic beds, in one or more reactors, in a so-called "once-through" hydrocracking layout, with or without liquid recycling of the unconverted fraction, possibly in association with a hydrorefining catalyst located upstream of the catalyst of the present invention.

The catalyst of the present invention may advantageously be used alone, in one or more ebullated bed reactors, in a so-called "once-through" hydrocracking layout, with or without liquid recycling of the unconverted fraction, possibly in association with a hydrorefining catalyst located in a fixed bed or ebullated bed reactor located upstream of the catalyst of the present invention.

The ebullated bed is operated with daily removal of the used catalyst and addition of fresh catalyst in order to keep the activity of the catalyst stable.

In a so-called "two-step" hydrocracking layout, with intermediate separation between the two reaction zones, in a given step, the catalyst of the present invention may be used in one or in both reactors in association or otherwise with a hydrorefining catalyst located upstream of the catalyst of the present invention.

Once Through Process

Hydrocracking which is termed "once-through" in the first instance and generally comprises intense hydrorefining which is intended to carry out intense hydrodenitrogenation and desulphurization of the feed before it is sent to the hydrocracking catalyst proper, in particular in the case in which said catalyst comprises a zeolite. This intense hydrorefining of the feed only causes limited conversion of the feed into lighter fractions, which is still insufficient and must therefore be completed over the more active hydrocracking catalyst. However, it should be noted that no separation is involved between the two catalyst types. All of the effluent from the reactor outlet is injected onto the hydrocracking catalyst proper and the products formed are only separated afterwards. This version of hydrocracking, once-through hydrocracking, has a variation in which the unconverted fraction is recycled to the reactor for more intense conversion of the feed.

Fixed Bed Once-through Process

For catalysts with a low silica content, the weight contents of the silica of the support in the composition of the catalyst are in the range 5% to 30%, preferably in the range 5% to 20%.

For catalysts with a high silica content, the weight contents of the silica of the support in the composition of the catalyst are in the range 20% to 80%, preferably in the range 30% to 60%.

In the case in which the catalyst of the present invention is used upstream of a zeolitic hydrocracking catalyst, for example based on Y zeolite, a catalyst with a low silicon content by weight as defined above is advantageously employed. It may also advantageously be used in association with a hydrorefining catalyst, this latter being located upstream of the catalyst of the present invention.

When the catalyst of the present invention is advantageously used upstream of a hydrocracking catalyst based on alumina-silica or based on zeolite, in the same reactor in distinct catalytic beds or in distinct reactors, the conversion is generally (or preferably) less than 50% by weight, more preferably less than 40%.

The catalyst of the invention may advantageously be used upstream or downstream of the zeolitic catalyst. Downstream of the zeolitic catalyst, it can crack polyaromatic hydrocarbons in particular such as those described in "Hydrocracking, Science and Technology" by J Scherzer, published by M Dekker Inc 1996.

Ebullated Bed Once-through Process

The catalyst of the invention may advantageously be used alone or in one or more reactors.

In the context of such a process, several reactors may advantageously be used in series, the ebullated bed reactor or reactors containing the catalyst of the invention being preceded by one or more reactors containing at least one fixed bed or ebullated bed hydrorefining catalyst.

When the catalyst of the present invention is used downstream of a hydrorefining catalyst, conversion of the fraction of the feed caused by said hydrorefining catalyst is generally (or preferably) less than 30% by weight, preferably less than 25%.

Fixed Bed Once-through Process with Intermediate Separation

The catalyst of the present invention may also be used in a once-through hydrocracking process comprising a hydrorefining zone, a zone for partial elimination of ammonia, for example hot flash, and a zone comprising a hydrocracking catalyst. This process for once-through hydrocracking of hydrocarbons for the production of middle distillates and possibly base oil comprises at least one first reaction zone including a hydrorefining, and at least one second reaction zone in which hydrocracking of at least a portion of the effluent from the first reaction zone is carried out. This process also comprises incomplete separation of ammonia from the effluent leaving the first zone. This separation is advantageously carried out using an intermediate hot flash. Hydrocracking carried out in the second reaction zone is carried out in the presence of ammonia in a quantity smaller than the quantity present in the feed, preferably less than 1500 ppm by weight, more preferably less than 1000 ppm by weight and still more preferably less than 800 ppm by weight of nitrogen. The catalyst of the present invention is preferably used in the hydrocracking reaction zone in association or otherwise with a hydrorefining catalyst located upstream of the catalyst of the present invention. The catalyst of the invention may be used upstream or downstream of the zeolitic catalyst. Downstream of the zeolitic catalyst, it can in particular be used to convert the polyaromatic hydrocarbons or polyaromatic hydrocarbon precursors.

The catalyst of the invention may advantageously be used either in the first reaction zone for converting pre-treatment, alone or in association with a conventional hydrorefining catalyst, located upstream of the catalyst of the invention, in one or more catalytic beds, in one or more reactors.

Once-through Hydrocracking Process with Preliminary Hydrorefining Over a Weakly Acidic Catalyst The catalyst of the invention may advantageously be used in a hydrocracking process comprising:
  a first hydrorefining reaction zone in which the feed is brought into contact with at least one hydrorefining catalyst having a cyclohexane conversion of less than 10% by weight in the standard activity test;

a second hydrocracking reaction zone in which at least a portion of the effluent deriving from the hydrorefining step is brought into contact with at least one zeolitic hydrocracking catalyst having a cyclohexane conversion of more than 10% by weight in the standard activity test, the catalyst, of the invention being present in at least one of the two reaction zones.

The proportion of the catalytic volume of the hydrorefining catalyst generally represents 20% to 45% of the total catalytic volume.

At least a portion, preferably all of the effluent derived from the first reaction zone is introduced into the second reaction zone of said process. An intermediate separation of the gases may be carried out as described above.

The effluent leaving the second reaction zone undergoes separation, termed "final" separation (for example by atmospheric distillation optionally followed by vacuum distillation), in order to separate the gases. At least one residual liquid fraction is obtained, essentially containing products with a boiling point generally of more than 340° C., which may be recycled at least in part upstream of the second reaction zone of the process of the invention, preferably upstream of the hydrocracking catalyst based on alumina-silica, with the aim of producing middle distillates.

The conversion into products with boiling points of less than 340° C. or less than 370° C. is at least 50% by weight.

Two-Step Process

Two-step hydrocracking comprises a first step which, like in the once-through process, is intended to carry out hydrorefining of the feed, but also of achieving a conversion thereof of the order of generally 40% to 60%. The effluent derived from the first step then undergoes separation (distillation), which is routinely termed intermediate separation, which is intended to separate the conversion products from the unconverted fraction. In the second step of a two-step hydrocracking process, only the fraction of the feed which is not converted during the first step is treated. This separation means that a two-step hydrocracking process can be more selective for middle distillates (kerosene+diesel) than a once-through process. In fact, intermediate separation of the conversion products avoids "over-cracking" to naphtha and gas in the second step over the hydrocracking catalyst. Further, it should be noted that the unconverted fraction of the feed treated in the second step generally contains very low quantities of $NH_3$ as well as organic nitrogen-containing compounds, in general less than 20 ppm by weight or even less than 10 ppm by weight.

The same configuration of fixed bed or ebullated bed catalytic beds may be used in the first step of, a two-step layout, irrespective of whether the catalyst is used alone or in association with a conventional hydrorefining catalyst. The catalyst of the invention may be used upstream or downstream of a zeolitic catalyst. Downstream of the zeolitic catalyst, it can in particular convert polyaromatic hydrocarbons or polyaromatic hydrocarbon precursors.

EXAMPLES

The following examples illustrate the invention without limiting its scope.

Example 1

Supported NiSiW Catalyst with Ni/W Ratio of Approximately 0.36 Atoms and Si/W Ratio of 0.09 Atoms (Comparative)

The molybdenum and cobalt were dry co-impregnated in an aqueous medium onto a commercial silica-alumina type support synthesized by the co-gel method (380 m$^2$/g). The tungsten precursor salt was ammonium metatungstate $(NH_4)_6 H_2W_{12}O_{40}, 4H_2O$; the nickel precursor salt was nickel nitrate $Ni(NO_3^-)_2, 6H_2O$. The silicon precursor was supplied in the form of rhodorsil. The quantity of nickel was adjusted in order to comply with a Ni/W molar ratio of 0.36 atoms/atom and the quantity of silicon was adjusted in order to comply with a Si/W molar ratio of 0.09 atoms/atom, the silicon atoms deriving from the support clearly not being taken into account in this calculation. After maturing for 12 hours, the extrudates were dried overnight at 120° C. then calcined in air at 450° C. for 2 hours. For this non-sulphurized NiW/SiAl catalyst, the tungsten oxide content was 16.8% and the nickel oxide content was 2.1%, corresponding to a real Ni/W ratio of 0.39 atoms/atom. This catalyst A was not in accordance with the invention.

Example 2

Supported NiWP Catalyst With Ni/W Ratio of Approximately 0.32 Atoms and P/W Ratio of 0.09 Atoms (Comparative)

The molybdenum and cobalt were dry co-impregnated in an aqueous medium onto a commercial silica-alumina type support synthesized by the co-gel method (380 m$^2$/g). The tungsten precursor salt was ammonium metatungstate $(NH_4)_6 H_2W_{12}O_{40}, 4H_2O$; the nickel precursor salt was nickel nitrate $Ni(NO_3)_2, 6H_2O$; the P precursor was $H_3PO_4$. The quantity of nickel was adjusted in order to comply with a Ni/W molar ratio of 0.32 atoms/atom and the quantity of $H_3PO_4$ was adjusted in order to comply with a P/W molar ratio of 0.09 atoms/atom. After maturing for 12 hours, the extrudates were dried overnight at 120° C. then calcined in air at 450° C. for 2 hours. For this non-sulphurized NiWP/SiAl catalyst, the tungsten oxide content was 16.7% and the nickel oxide content was 1.7% and the quantity of $P_2O_5$ was 0.5%, corresponding to a real Ni/W ratio of 0.32 atoms/atom and a P/W ratio of 0.1. This catalyst B was representative of an industrial catalyst and was not in accordance with the invention.

Example 3

Supported NiSiW Catalyst with Ni/W Ratio of Approximately 0.36 Atoms and Si/W Ratio of 0.09 Atoms (in Accordance with the Invention)

4 equivalents of barium hydroxide (13.98 g of $Ba(OH)_2$ introduced in the form of 25.75 g of $Ba(OH)_2, 8H_2O$, pH=6.25) was added to a 0.1 mol/L solution of silicotungstic acid (58.76 g of $H_4SiW_{12}O_{40}$ (introduced in the form of 63.86 g of $H_4SiW_{12}O_{40}, 13H_2O$) in 200 mL of water, pH=0.6). The barium salt of the heteropolyanion precipitated out. It was recovered and dried on a frit in a stream of air. The mass of the product $Ba_4SiW_{11}O_{39}$ obtained was 55.92 g, i.e. a yield of 85%. The 55.92 g of the product $Ba_4SiW_{11}O_{39}$ was taken up into solution in 170 mL of deionized water. The solution was heated slightly to 45° C. to dissolve the barium salt of the heteropolyanion. The concentration of the dissolved salt was 0.1 mol/L.

The prepared solution was then passed over a cation exchange resin. The solution was added drop by drop. This resin was a highly acidic commercial resin with a uniform granulometric distribution around 585 μm: Dowex Marathon C. The skeleton was formed by a styrene gel cross-linked by DVB. The functional groups were sulphonates, $SO_3^-$. It was received in its Na+ form. Prior to exchange of $Ba^{2+}$ by $Ni^{2+}$, the resin was placed into its $Ni^{2+}$ form using a saturated $NiSO_4$ solution. Once the resin had been placed in its $Ni^{2+}$ form, 92 mL of resin was placed in a stainless steel column with a 10 mm internal radius. The height of the bed was then 450 mm. This column was placed in an oven heated to 45° C. to allow the salts to dissolve during the exchange step. The 170 mL of solution heated to 45° C. passed into the column. Once the first 49 millilitres of solution, corresponding to the dead volume, had passed through, 160 mL of solution containing $Ni_4SiW_{11}O_{39}$ at a concentration of 0.1 mol/L was recovered. The $Ba_4SiW_{11}O_{39}$ species was only present in trace amounts. The solution was then partially evaporated and concentrated. The final concentration of $Ni_4SiW_{11}O_{39}$ in the solution was 0.16 mol/L. These 100 mL of solution obtained was then impregnated onto a commercial silica-alumina type support synthesized by a co-gel method (380 m²/g). After maturing for 12 hours, the extrudates were dried overnight at 120° C., then calcined in air at 450° C. for 2 hours.

For this non-sulphurized NiW/SiAl catalyst, the tungsten oxide content was 17.1% and the nickel oxide content was 1.9%, corresponding to a real Ni/W ratio of 0.36 atoms/atom. This catalyst T1 was in accordance with the invention.

Example 4

Supported NiPW Catalyst with a Ni/W Ratio of Approximately 0.32 Atoms and P/W Ratio of 0.09 Atoms (in Accordance with the Invention)

3.5 equivalents of barium hydroxide (12.52 g of $Ba(OH)_2$ introduced in the form of 23.06 g of $Ba(OH)_2$, $8H_2O$, pH=4.96) was added to a 0.1 mol/L solution of phosphotungstic acid (52.7 g of $H_3PW_{12}O_{40}$ (introduced in the form of 56.9 g of $H_3PW_{12}O_{40}$, $13 H_2O$) in 180 mL of water, pH=0.5). The barium salt of the heteropolyanion precipitated out. It was recovered and dried on a frit in a stream of air. The mass of the product $Ba_{7/2}PW_{11}O_{39}$ obtained was 50.4 g, i.e. a yield of 88%. The 50.4 g of the product $Ba_{7/2}PW_{11}O_{39}$ was taken up into solution in 160 mL of deionized water and was heated slightly to 45° C. to dissolve the barium salt of the heteropolyanion. The concentration of the dissolved salt was then 0.1 mol/L.

The prepared solution was then passed over a cation exchange resin. The solution was added drop by drop. This resin was a highly acidic commercial resin with a uniform granulornetic distribution around 585 μm: Dovvex Marathon C. The skeleton was formed by a styrene gel cross-linked by DVB. The functional groups were sulphonates, $SO_3^-$. It was received in its Na+ form. Prior to exchange of $Ba^{2+}$ by $Ni^{2+}$, the resin was placed into its $Ni^{2+}$ form using a saturated $NiSO_4$ solution. Once the resin had been placed in its $Ni^{2+}$ form, 75 mL of resin was placed in a stainless steel column with a 10 min internal radius. The height of the bed was then 369 mm. This column was placed in an oven heated to 45° C. to allow the salts to dissolve during the exchange step. The 160 ml, of solution heated to 45° C. passed into the column. Once the first 41 millilitres of solution, corresponding to the dead volume, had passed through, 150 mL of solution containing $Ni_{7/2}PW_{11}O_{39}$ at a concentration of 0.1 mol/L was recovered. The $Ba_{7/2}PW_{11}O_{39}$ species was only present in trace amounts. The solution was then partially evaporated and concentrated. The final concentration of the solution was 0.16 mol/L. These 100 mL of solution obtained was then impregnated onto a commercial silica-alumina type support synthesized by a co-gel method (380 m²/g). After maturing for 12 hours, the extrudates were dried overnight at 120° C., then calcined in air at 450° C. for 2 hours.

For this non-sulphurized NiW/SiAl catalyst, the tungsten oxide content was 16.9%, the nickel oxide content was 1.8% and the $P_2O_5$ content was 0.5%, corresponding to a real Ni/W ratio of 0.32 atoms/atom and a P/W ratio of 0.1. This catalyst T2 was in accordance with the invention.

Example 5

Analysis of Impregnation Solutions and of Catalysts in the Dry State for the Examples in Accordance with the Invention The impregnation solutions respectively containing $Ni_4SiW_{11}O_{39}$ and $Ni_{7/2}PW_{11}O_{39}$ prepared in Examples 3 and 4 were analyzed by $^{29}Si$ NMR in the case of Example 3 and by $^{31}P$ NMR in the case of Example 4. The spectra are respectively shown in FIGS. 1 and 2.

Figure 1:
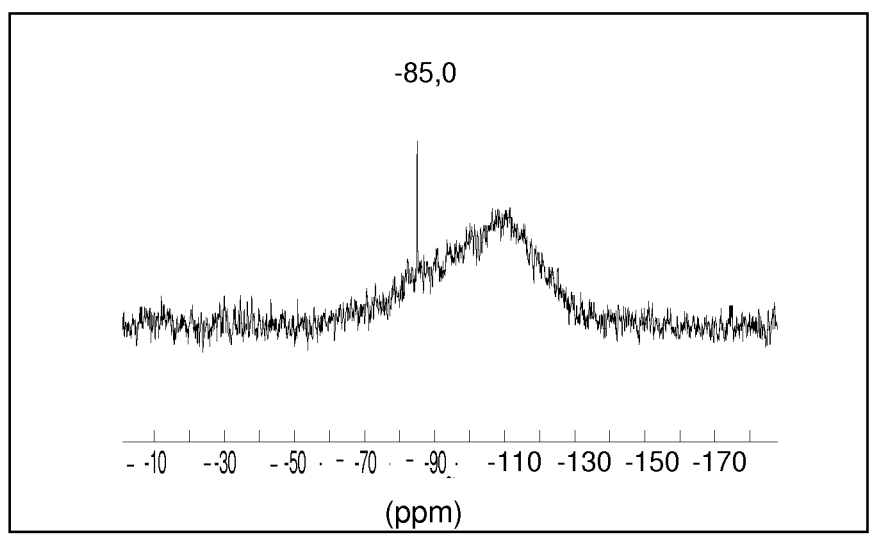
FIG. 1 shows the $^{29}Si$ NMR spectrum of the solution containing the $Ni_4SiW_{11}O_{39}$.
Figure 2:
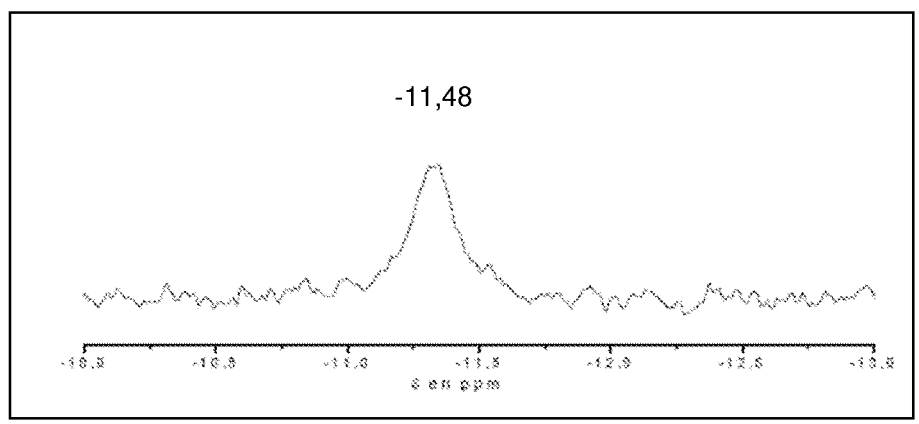
FIG. 2 shows the $^{31}P$ NMR spectrum of the solution containing the $Ni_{7/2}PW_{11}O_{39}$.

In both cases, it was verified that no signal was visible between 300 and 600 ppm, which indicated that species had been prepared wherein the Ni was substituting for a W atom. On the other hand, if Ni had entered the structure, the signals observed at −85.0 ppm in $^{29}Si$ NMR and at −11.48 in $^{31}P$ NMR would not have existed.

Finally, the catalysts prepared in Examples 3 and 4 were characterized in the dry state by Raman spectroscopy. Table 1 shows the principal bands and characteristics of the terminal W—O bonds of the heteropolyanions. These bands with a wave number of less than 1000 cm⁻¹ are characteristic of lacunary heteropolycompounds. The wave numbers of silicotungstic acid ($H_4SiW_{12}O_{40}$, Keggin type HPC) and of phosphotungstic acid ($H_3PW_{12}O_{40}$, Keggin type HPC) at the origin of the Ni salts of the lacunary Keggin type HPAs based on W of Examples 3 and 4 had wave numbers of 1011 cm⁻¹ and 1000 cm⁻¹ respectively.

TABLE 1

Principal bands identified by Raman spectroscopy of catalysts prepared in Examples 3 and 4 in the dry state

| Catalyst | Characteristics of catalyst | Wave number of principal band (cm⁻¹) |
|---|---|---|
| T1, dry | NiSiW:Ni/W = 0.36, 17.1% $WO_3$ (in accordance) | 988 |
| T2, dry | NiPW:Ni/W = 0.36, 16.9% $WO_3$ (in accordance) | 984 |

Example 6

Toluene (Model Aromatic Molecule) Hydrogenation Test in the Presence of Aniline

The test for hydrogenation of toluene in the presence of aniline is intended to evaluate the hydrogenating activity of bulk or supported sulphurized catalysts, in the presence of $H_2S$ and at hydrogen pressure. The isomerization which characterizes the acid function of the catalyst is inhibited by the presence of aniline at low temperatures and/or by the presence of NH$_3$ (derived from the decomposition of aniline) at higher temperatures. The aniline and/or NH$_3$ will react with the acidic sites of the support via an acid-base reaction. The characteristic isomerization reactions of the acidity of the support are then non-existent.

We took, care to carry out the comparison of the 4 catalysts on the same catalytic test unit in order not to falsify the comparisons by using different catalytic test tools which could displace the results.

The catalytic test was carried out in the gas phase in a fixed traversed bed reactor. The test can be broken down into two distinct phases, sulphurization and the catalytic test. The test was carried out at 60 bar.

Sulphurization:

The catalysts were dynamically sulphurized in situ in a traversed fixed bed tube reactor of the Catatest type (built by Vinci Technologies) pilot unit with the fluids moving from top to bottom. The hydrogenating activity measurements were carried out immediately after sulphurizing under pressure, without opening up to the air, using the hydrocarbon feed which had served to sulphurize the catalysts. The sulphurization feed was the same as that of the test.

Catalytic Test:

The test feed was composed of dimethyldisuphide (DMDS), toluene, cyclohexane and aniline.

The stabilized catalytic activities were measured for equal volumes of catalysts (4 cm$^3$) and, at a temperature of 350'C.

The operating conditions of the test were as follows (assuming complete vaporization and the perfect gas law):

For P$_{tot}$=60 bar and T=350° C.:
PpH$_2$=36.62 bar;
PpNH$_3$=0.09 bar;
PpH$_2$S=2.16 bar
Pptoluene=3.75 bar;
Ppcyclohexane=15.22 bar;
HSV=1 L/L/h;
H$_2$/feed=450.

Samples of the effluent were analysed by gas chromatography. We expressed the toluene conversion, which is a first order reaction under the conditions we employed, by the hydrogenating activity (HA). This toluene conversion characterized the hydrogenating function of the catalyst.

$$HA_{1st\ order} = \log_e \frac{100}{(100 - \%\ HYD_{toluene})}$$

In which % HYD$_{toluene}$ corresponds to the fraction of toluene converted.

The catalytic performances are shown in Table 2. They are expressed as the relative activity, setting catalyst B to be equal to 100.

TABLE 2

Relative hydrogenating activity of catalysts of the invention. These are expressed as the relative activity, setting catalyst B to be equal to 100.

| Catalyst | Hydrogenating activity (HA) relative to B |
|---|---|
| A (not in accordance) | 97 |
| B (not in accordance) | 100 |
| T1 (in accordance) | 135 |
| T2 (in accordance) | 129 |

Table 2 shows the large increase in hydrogenating power obtained for the catalysts prepared from the heteropolycompounds Ni$_4$SiW$_{11}$O$_{39}$ and Ni$_{7/2}$PW$_{11}$O$_{39}$ of the invention (catalysts T1 and T2 respectively) compared with catalysts which are their homologues as regards formulation but which were prepared using conventional techniques, not using Ni salts of lacunary Keggin type heteropolyanions containing W.

Example 7

Evaluation of Catalysts C1, C2, C3 and C4 in Hydrocracking a Vacuum Distillate which has been Hydrotreated at High Pressure Catalysts A, B, T1 and T2, the preparations for which are described in Examples 1, 2, 3 and 4, were used under high pressure vacuum distillate hydrocracking conditions (14 MPa). The feed used was a hydrotreated feed. A layout was simulated wherein the hydrotreatment catalyst was in a concatenation with catalysts A, B, T1 and T2.

The principal characteristic of the previously hydrotreated feed are shown in Table 3.

TABLE 3

| Characteristics of hydrotreated vacuum distillates | |
|---|---|
| Density at 15° C. | 0.896 |
| Sulphur (wt %) | 0.08 (supplemented at 2.1%) |
| Nitrogen (ppm by weight) | 280 (supplemented at 1350 ppm) |
| Simulated distillation | |
| 10% point | 366° C. |
| 50% point | 442° C. |
| 90% point | 520° C. |

The catalytic test unit comprised a fixed bed reactor in upflow mode. 40 mL of catalyst of the invention (A, B, T1, T2) was introduced into the reactor. The catalyst underwent an in situ sulphurization step before, reaction. The catalyst was sulphurized at 14 MPa, at 350° C. using a straight run gas oil supplemented with 2% by weight of DMDS. Once sulphurization had been completed, the feed described above could be transformed.

The catalytic tests were carried out under the following conditions:
Total pressure: 14 MPa;
Hydrogen flow rate 1000 litres of gaseous hydrogen per liter of injected feed;
hourly space velocity (HSV) equal to 0.75 h$^{-1}$;
temperature: temperature required to reach 60% net conversion at the reactor outlet. The net conversion into products with a boiling point of less than 370° C., denoted NC 370° C., was taken to be equal to NC370° C.=[(% of 370° C.$^-_{effluents}$)−(% of 370° C.$^-_{feed}$)]/[100−(% of 370° C.$^-_{feed}$)]

wherein
% of 370 C$^-$=content by weight of compounds with boiling points less than 370° C.

The gross selectivity for middle distillates (150-370° C. cut), denoted GS MD, was taken to be equal to:

GS MD=[(fraction of 150-370$_{effluents}$)]/[(% of 370° C.$^-_{effluents}$)].

The catalytic performances were expressed as the temperature required to reach 60% net conversion into products with a boiling point of less than 370° C. and by the gross selectivity for middle distillates (150-370° C. cut). The conversion and the selectivity were expressed using the simulated distillation results.

In Table 4 below, we record the reaction temperature necessary to obtain 60% gross conversion into 370° C.⁻ and the gross selectivity for the catalysts of the invention.

TABLE 4

Catalytic results for high pressure hydrocracking

| Catalyst | HSV (h$^{-1}$) | Temperature necessary to obtain 60% NC 370° C., wt % | GS MD, wt % |
|---|---|---|---|
| A | 0.75 | 406° C. | 81.7 |
| B | 0.75 | 405° C. | 81.9 |
| T1 | 0.75 | 402° C. | 82.6 |
| T2 | 0.75 | 403° C. | 82.5 |

The examples above thus show the importance of using a catalyst of the invention (T1, T2) for carrying out hydrocracking of hydrocarbon feeds. The catalysts of the invention can produce much higher conversions of the feed without loss of selectivity for middle distillates. The improved hydrogenating power of the active phase thanks to the use of novel structures, namely the Ni salt of a lacunary Keggin type heteropolyanion containing W means that more aromatic rings can be hydrogenated and thus more crackable and cracked molecules can be generated, thereby improving conversion. Further, for a given conversion, the stronger the hydrogenating function, the less overcracked are the molecules, less gasoline and gases are generated, and thus the selectivity for middle distillates is increased.

The invention claimed is:

1. A heteropolycompound constituted by a nickel salt of a lacunary Keggin type heteropolyanion comprising tungsten in its structure, with formula:

$$Ni_{x+y/2}AW_{11-y}O_{39-(5/2)y}, zH_2O$$

wherein Ni is nickel;
A is phosphorus, silicon or boron;
W is tungsten;
O is oxygen;
y=0 or 2;
x=3.5 if A is phosphorus;
x=4 if A is silicon;
x=4.5 if A is boron; and
and z is a number in the range 0 to 36, and m equals 3 if A is phosphorus, m equals 4 if A is silicon and m equals 5 is A is boron, in which said heteropolycompound has no nickel atom in substitution for a tungsten atom in its structure, said nickel atoms being placed in the counterion position in the structure of said compound.

2. The heteropolycompound of claim 1, wherein said heteropolycompound has the following formula:

$$Ni_xAW_{11}O_{39}, zH_2O \quad (I)$$

wherein Ni is nickel;
A is phosphorus, silicon or boron;
W is tungsten;
O is oxygen;
x is a number equal to 3.5 if the group A is phosphorus, equal to 4 if the group A is silicon or equal to 4.5 if the group A is boron;
and z is a number in the range 0 to 36.

3. The heteropolycompound of claim 2, wherein said heteropolycompound is a compound with formula: $Ni_4SiW_{11}O_{39}$.

4. The heteropolycompound of claim 1, wherein said heteropolycompound has the following formula:

$$Ni_{x+1}AW_9O_{34}, zH_2O \quad (II)$$

wherein Ni is nickel;
A is phosphorus, silicon or boron;
W is tungsten;
O is oxygen;
x is a number equal to 3.5 if the group A is phosphorus, equal to 4 if the group A is silicon or equal to 4.5 if the group A is boron; and z is a number in the range 0 to 36.

5. The heteropolycompound of claim 4, wherein said heteropolycompound is a compound with formula $Ni_5SiW_9O_{34}$.

6. A catalyst comprising said heteropolycompound of claim 1 and optionally at least one acidic porous mineral matrix.

7. The catalyst of claim 6, wherein said catalyst is in the form of a bulk catalyst.

8. The catalyst of claim 6, wherein said catalyst is a supported catalyst, the support being formed by at least one acidic porous mineral matrix that is silica-aluminas, aluminosilicates, crystalline or otherwise, mesostructured or otherwise, doped aluminas, or non-zeolitic crystalline molecular sieves.

9. A hydrocracking, hydroconversion and/or hydrotreatment process comprising performing said hydrocracking, hydroconversion and/or hydrotreatment process in the presences of the catayst of claim 6.

10. A process for the preparation of said heteropolycompound, constituted of claim 1, comprising a nickel salt of lacunary Keggin type heteropolyanions comprising tungsten in its structure, said process comprising:

1) synthesizing the Keggin heteropolyanion containing tungsten with formula:

$$Ni_{x+y/2}AW_{11-y}O_{39-(5/2)y}, zH_2O \quad (I')$$

wherein Ba is barium, A is phosphorus, silicon or boron, W is tungsten, O is oxygen, y=0 or 2, x is a number equal to 3.5 if A is phosphorus, equal to 4 if A is silicon or equal to 4.5 if A is boron, and x=m/2+2 for the rest and z is a number in the range 0 to 30, by reacting heteropolytungstic acids $H_mAW_{12}O_{40}$ in which A is phosphorus, silicon or boron, H is hydrogen, W is tungsten, O is oxygen and m is equal to 3 if A is phosphorus, m is equal to 4 if A is silicon and m is equal to 5 if A is boron, to which are added x+y/2 equivalents of barium hydroxide $(Ba(OH)_2)$ to form compounds with formula $Ba_{x+y/2}AW_{11-y}O_{39-5/2y}$, $zH_2O$ (I'), in accordance with the following equation:

$$H_mAW_{12}O_{40}+((m/2+2)+y/2)Ba(OH)_2 \rightarrow Ba_{(m/2+2+y/2)}AW_{11-y}O_{39-5/2y}+(y+1)HWO_4^-+(y+1)H^++(m+1-y/2)H_2O;$$

2) forming the nickel salt of the Keggin heteropolyanion containing tungsten with formula $Ni_{x+y/2}AW_{11-y}O_{39-5/2y}, zH_2O$ (I) from the Keggin heteropolyanion containing tungsten derived from 1) by substituting $Ba^{2+}$ cations with $Ni^{2+}$ cations by ion exchange on cation exchange resins, said cation exchange resins having previously been exchanged with $Ni^{2+}$ cations.

11. The process of claim 10, wherein the Keggin heteropolyanion containing tungsten prepared in 1) is the heteropolyanion with formula: $Ba_xAW_{11}O_{39}, zH_2O$ and the nickel salt of the heteropolyanion containing tungsten is the compound with formula: $Ni_xAW_{11}O_{39}, zH_2O$.

12. The process of claim 10, wherein the Keggin heteropolyanion containing tungsten prepared in 1) is the heteropolyanion with formula: $Ba_{x+1}AW_9O_{34}, zH_2O$ and the nickel salt of the heteropolyanion containing tungsten is the compound with formula: $Ni_{x+1}AW_9O_{34}, zH_2O$.

* * * * *

UNITED STATES PATENT AND TRADEMARK OFFICE
CERTIFICATE OF CORRECTION

PATENT NO.       : 8,633,128 B2                           Page 1 of 1
APPLICATION NO.  : 13/059254
DATED            : January 21, 2014
INVENTOR(S)      : Bonduelle et al.

It is certified that error appears in the above-identified patent and that said Letters Patent is hereby corrected as shown below:

In the Claims:

Column 22, line 30 reads "pound, constituted of claim 1, comprising a nickel salt of" should read --pound, of claim 1, comprising a nickel salt of--.

Signed and Sealed this
Twenty-seventh Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,633,128 B2
APPLICATION NO.  : 13/059254
DATED            : January 21, 2014
INVENTOR(S)      : Bonduelle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 382 days.

Signed and Sealed this
Twenty-second Day of September, 2015

Michelle K. Lee
*Director of the United States Patent and Trademark Office*